(Model.)

A. FASIG.
WHIFFLETREE.

No. 246,107. Patented Aug. 23, 1881.

Witnesses
Wm. N. Mortimer
A. C. Kiskadden

Inventor,
Alb. Fasig,
per
F. A. Lehmann,
Atty.

UNITED STATES PATENT OFFICE.

ALBERT FASIG, OF ASHLAND, OHIO.

WHIFFLETREE.

SPECIFICATION forming part of Letters Patent No. 246,107, dated August 23, 1881.

Application filed March 19, 1881. (Model.)

*To all whom it may concern:*

Be it known that I, ALBERT FASIG, a citizen of the United States, residing at Ashland, in the county of Ashland and State of Ohio, have invented certain new and useful Improvements in Whiffletrees; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to an improvement in single and double trees; and it consists in making the tree of one continuous piece of pipe, which is strengthened at its center by a sleeve secured in place in any suitable manner, and then strengthening the two parts thus formed by means of the bracing-rod, which extends from one end of the tree to the other, and which is secured in position at its center by means of bands or other suitable fastenings, as will be more fully described hereinafter.

The object of my invention is to make a light and cheap single or double tree, which, while it is smaller than the usual trees now in use, cannot be broken by any strain that a horse can bring to bear upon it.

Figure 1:
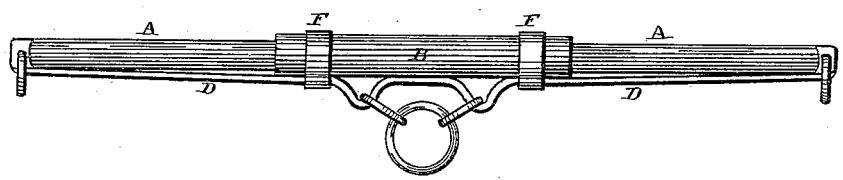
Figure 2:

Figure 1 is a plan view of my invention complete. Fig. 2 is a vertical longitudinal section of the same.

A represents a pipe, of any suitable length and thickness, and which has its two ends closed, as shown in Fig. 2, and through these ends are made a suitable hole to fasten a ring or a hook in, as shown in Fig. 1. These ends will be closed by heating them and then pounding them together by means of a suitable tool. Over the center of this pipe is passed the sleeve B, of any suitable length, and which may be secured in position either by any mechanical means or passed over the pipe while heated, and then allowed to shrink upon the pipe after it has become cooled. This sleeve strengthens and braces the pipe, so that it is impossible to break it by any strain which can be brought to bear upon it by a horse or other animal.

In order to still further strengthen the tree, and at the same time provide a means by which the tree can be attached to another portion of the vehicle, the brace-rod D is secured to the rear side of the tree, and which rod is secured in position at its center by means of the collars F, which are here slipped over it. The ends of this rod are fastened to the outer ends of the pipe by means of welding or any other suitable means.

A single or double tree thus constructed is very light, small, durable, and much stronger than those of ordinary construction.

Having thus described my invention, I claim—

A double-tree composed of the continuous pipe A, the sleeve B, the brace-rod D, and the collars F, the ends of the pipe A being closed by welding, and having the ends of the brace-rod connected thereto in a similar manner, substantially as shown and described.

In testimony whereof I affix my signature in presence of two witnesses.

ALBERT FASIG.

Witnesses:
BYRON STILWELL,
M. V. HINKLE.